Figure 1:
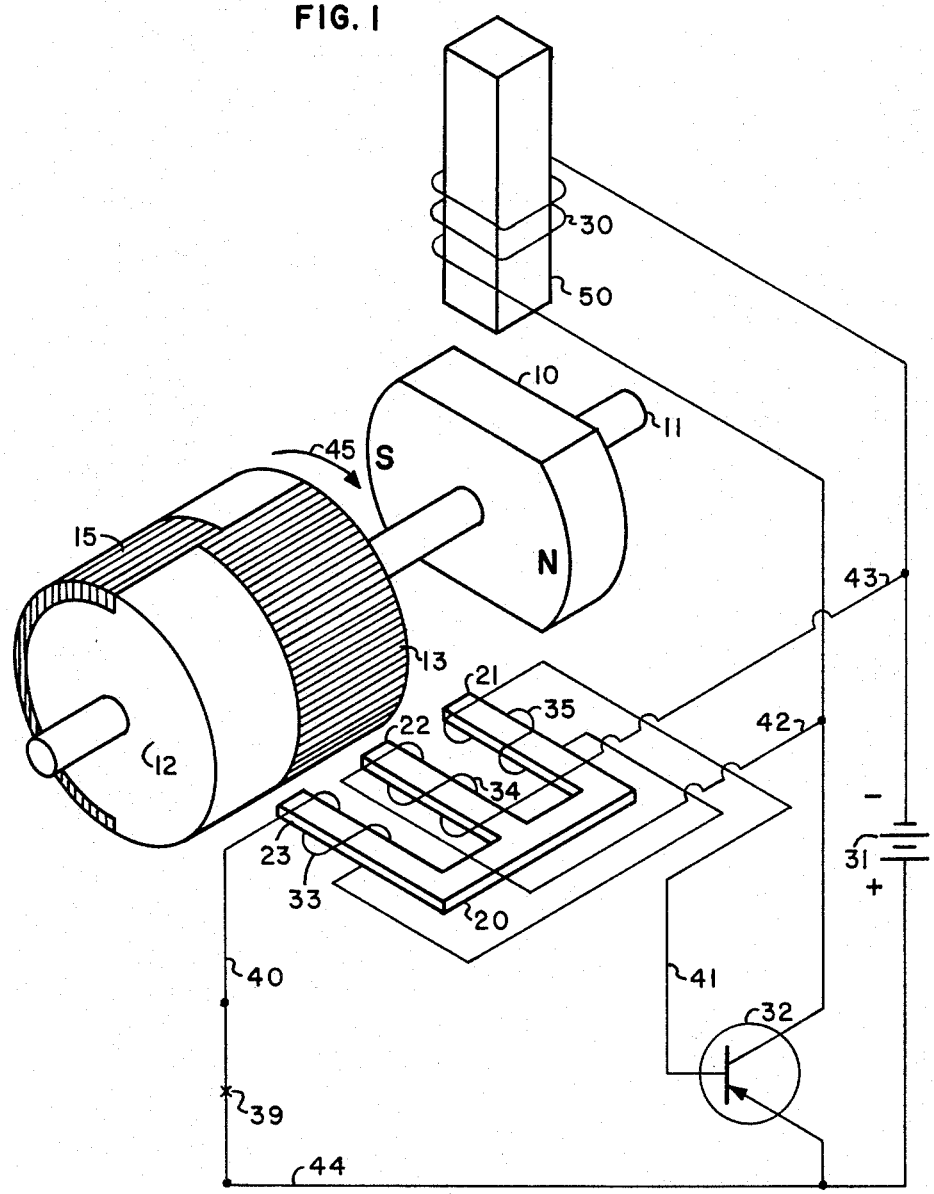

March 23, 1965  J. S. HOGAN ETAL  3,175,140
BRUSHLESS DIRECT CURRENT MOTOR
Filed July 17, 1961                                                2 Sheets-Sheet 1

Jimmie S. Hogan
Robert L. Hogan
INVENTORS

Jimmie S. Hogan
Robert L. Hogan
INVENTORS

United States Patent Office 3,175,140
Patented Mar. 23, 1965

3,175,140
BRUSHLESS DIRECT CURRENT MOTOR
Jimmie S. Hogan, 4501 Creekbend Drive, Houston, Tex.,
and Robert L. Hogan, Houston, Tex.; said Robert L.
Hogan assignor to said Jimmie S. Hogan
Filed July 17, 1961, Ser. No. 125,049
6 Claims. (Cl. 318—138)

The present invention relates to electric motors and more particularly to brushless direct current type motors.

More particularly still the present invention relates to an electric motor that utilizes a permanent magnet rotor and an electronic commutator that controls the energization of the field coils and provides a self-starting motor with a selective direction of rotation without the need of brushes.

My copending application Serial No. 110,798, filed on May 17, 1961, now Patent No. 3,091,728 discloses a brushless D.C. motor with an electronic commutator. The invention of this instant is similar to the invention disclosed by that application in that both inventions utilize a permanent magnet rotor and an electronic commutator. However, the motor of the present invention is particularly distinguishable since its control circuit energizes the field coils in a relationship to the discrimination of electric phases.

It is a general object of the present invention to provide an improved D.C. type electric motor that does not require brushes and thus overcomes many of the objections of motors with brushes including arcing, wear, and friction losses.

It is a particular object of the present invention to provide a self-starting brushless D.C. electric motor with characteristics of simple control of rotational direction.

A further object of the present invention is to provide an improved electric motor which is particularly suited for use as a servomotor due to its reversible feature.

Figure 2:
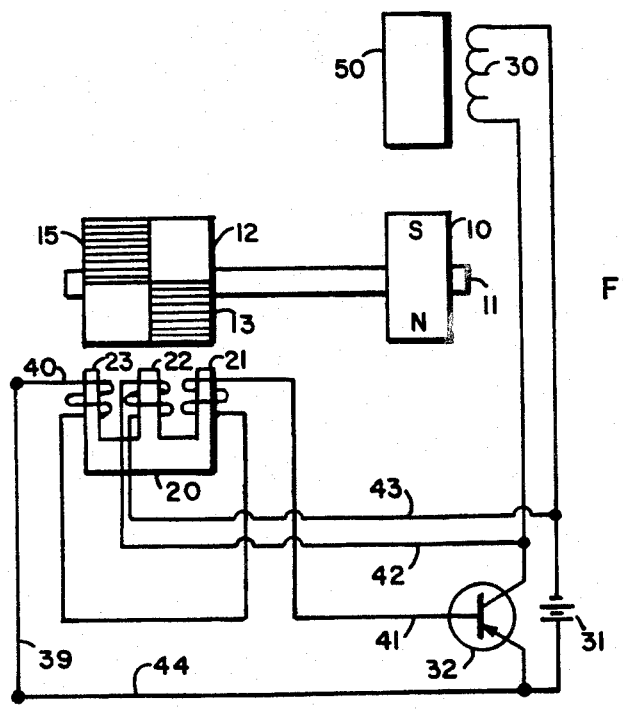
Figure 3:
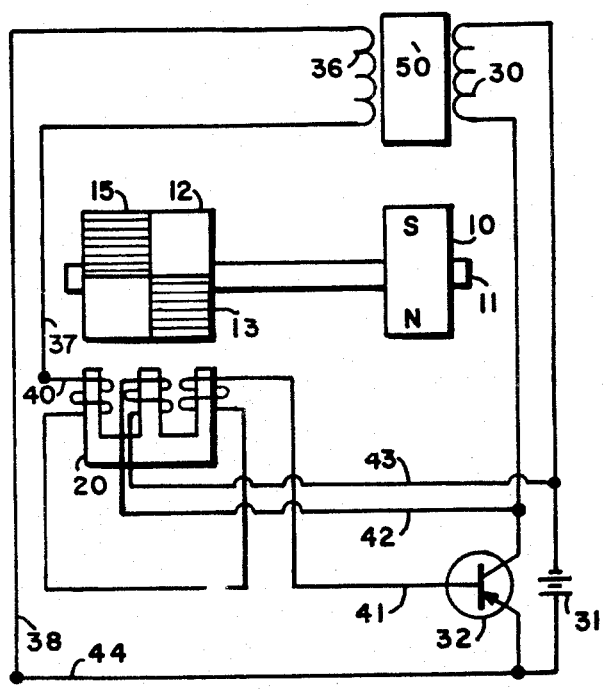

Other objects and advantages of the present invention will become readily apparent as the same is better understood by reference to the following detailed description and accompanying drawings. In the drawings, identical reference numerals are used for like parts, wherewith:

FIGURE 1 is a schematic view of the electric motor of the present invention;

FIGURE 2 schematically illustrates one electrical circuit for the present invention; and FIGURE 3 schematically illustrates a modified electrical circuit for the present invention.

Referring now to the FIGURE 1, 10 is a permanently magnetized rotor, 11 is the rotor shaft, and 50 is the motor field structure. 12 is the phase control rotor made of non-magnetic materials such as plastic or copper with ferromagnetic sections 13 and 15. The pickup structure is made of ferromagnetic material and is shown at 20 with arms distinguished at 21, 22, and 23. The electrical circuit includes a battery shown at 31, a transistor at 32, a driving coil at 30, a generator coil at 36, pickup coils at 33 and 35, and an oscillator coil at 34.

Considering now in greater detail the operation of the motor, it will be understood that the motor rotor 10 and the phase control rotor 12 are suitably mounted for rotation on shaft 11. Such mounting is not shown in detail since it is assumed that suitable mountings can be provided. The drive coil 30 is suitably mounted relative to rotor 10 to impart a torque to rotor 10 to rotate it and field structure 50 is mounted to convey magnetic flux from drive coil 30 to rotor 10. Actually, if desired, structure 50 may be omitted since the magnetic flux may proceed directly from drive coil 30 to rotor 10 without need for structure 50 to convey same. The pickup structure 20 is mounted adjacent to and is magnetically coupled with the phase control rotor 12 so that rotation of the control rotor 12 controls the magnetic flux in structure 20 and reverses the resultant electrical polarity of coils 33 and 35.

It can now be appreciated that rotor 10 is rotated by the torque produced by drive coil 30 when energized by battery 31 and that the current in drive coil 30 is switched by transistor 32.

The circuit windings of coils 34 and 35 are wound in a direction to assume a state of self-regenerative oscillations when section 13 magnetically couples coils 34 and 35 through arms 21 and 22, as in the position shown by the drawing. Additionally, when section 15 magnetically couples coils 33 and 34 through arms 22 and 23, the circuit oscillations are degenerative and the circuit assumes a quiescent state.

The current induced in coil 35 by coil 34 is of such polarity that it tends to make transistor 32 more conductive; the current induced in coil 33 by coil 34 tends to switch transistor 32 to a non-conductive state. Therefore, since coils 33 and 35 are series coupled to the base of transistor 32 by conductor 41, the resultant polarity of coils 33 and 35, induced by coil 34, is such that transistor 32 tends to be conductive when section 13 is adjacent to structure 20 and non-conductive when section 15 is adjacent to structure 20. When section 13 magnetically couples coils 34 and 35, coil 34 is energized and magnetic flux builds up in arms 21 and 22 inducing a current in coil 35 until arm 21 becomes magnetically saturated. Current is no longer induced in coil 35 when arm 21 becomes magnetically saturated and this switches the transistor to a non-conductive state which deenergizes coil 34 and causes the flux in arm 21 to collapse. Therefore, the circuit oscillates, when section 13 is adjacent to structure 20, with transistor 22 being conductive in phase with the magnetic flux build-up in arm 21 and non-conductive with the collapse of such flux; the circuit stops oscillating when the rotor is rotated to where section 15 is adjacent to structure 20.

With section 13 stationary and adjacent to structure 20, oscillations are started first in coil 35 when transistor 32 is shocked temporarily into a state of conduction by closing the circuit to battery 13; with the rotor rotating, the circuit always goes into oscillation when section 13 rotates into a position adjacent to structure 20 due to the disturbance of transient magnetic fluxes in structure 20 when the magnetic circuit of structure 20 changes from section 15 to section 13.

For illustrative purposes, only one structure 20 and transistor 32, with associated circuit, is shown in FIGURE 1. As described later in these specifications, inventors have proposed that at least three such circuits, equally spaced around the rotors, be used to assure self-starting. With three complete circuits, including three separate structures 20 equally spaced around rotor 12, at least one structure 20 is always adjacent to section 13 to commence oscillations when the circuit to battery 31 is first turned on. With one of such three complete circuits oscillating, rotor 10 commences to rotate and the other two circuits commence to oscillate, in turn, for the reasons described above. Additionally, the oscillating magnetic flux induced in section 13 by coil 34 of a first oscillating circuit tends to further assure that a second circuit commences to oscillate when structure 20 of such first and second circuits are magnetically coupled simultaneously with section 13.

For example, with the control rotor 12 in a first position as shown by FIGURE 1 of the drawings, ferromagnetic section 13 conveys magnetic flux from oscillator arm 22 to pickup arm 21. Therefore, with ferromagnetic section 13 of control rotor 12 in said first position, the energized coil 34 induces a current in coil 35 with a first resultant polarity for coils 33 and 35 connected in series as shown. Assuming that said induced current with said first resultant polarity for coils 33 and 35 is of such polarity that it tends to increase the magnitude of the circuit oscillations (that is, when coil 34 is energized, said first polarity induces a more negative voltage on the transistor base than on its emitter which makes the transistor conductive), then transistor 32 energizes coil 30 with pulses of direct current from power source 31, in phase with said oscillations, and the energized drive coil imparts a torque of a first direction on motor rotor 10. However, should the control rotor 12 be rotated 180° (referred to as a second position) from the position as shown by FIGURE 1, then ferromagnetic section 15 conveys magnetic flux from oscillator arm 22 to pickup arm 23. It should be noted that with the control rotor 12 in said second position, the resultant phase polarity of coils 33 and 35 has been reversed to a second polarity which tends to stop the circuit from oscillating.

It can now be appreciated that the motor as illustrated by FIGURE 1 of the drawings operates as follows:

The phase control rotor 12, being magnetically coupled to pickup structure 20, allows oscillator coil 34 to induce a current of a first resultant polarity in coils 33 and 35 when ferromagnetic section 13 is adjacent to arms 21 and 22 and a second resultant polarity when ferromagnetic section 15 is adjacent to arms 22 and 23. The circuit oscillates with said first resultant electrical polarity of coils 33 and 35 and does not oscillate with said second resultant electrical polarity of coils 33 and 35. Control rotor 12 thus allows the circuit to oscillate for the 180° that ferromagnetic section 13 is adjacent to pickup structure 20 and stops the circuit from oscillating for the 180° that ferromagnetic section 15 is adjacent to pickup structure 20. The oscillating circuit energizes drive coil 30 with pulses of direct current, in phase with said oscillations, which imparts a pulsative torque of a selected direction on rotor 10 and said torque is thus commutated by the position of control rotor 12 controlling said oscillations.

It should be noted that the motor operating as described above rotates in a fixed selected direction of rotation. However, reversing the polarity of coils 33 and 35 by changing the conductors at points 40 and 41 changes the phase discriminating characteristics of structure 20 with coils 33 and 35, and reverses the direction of rotation. This is a particularly favorable characteristic of the present invention since the addition of a simple two pole double throw switch makes the motor easily reversible.

It should be noted that the motor drive coil 30, operating as described above, is energized with a pulsative direct current since transistor 32 switches a D.C. source of power in phase with the oscillations picked up in coil 35. This is sometimes undesirable and can be changed easily by the addition of generator coil 36 which is shown by the modified circuit of FIGURE 3. With generator coil 36, the motor operates the same as described above but after a fixed rotational speed is reached, the current generated in coil 36 by rotating rotor 10 overrides the oscillations induced in coils 33 and 35 and thus causes the transistor to be steadily conductive for the power cycle. That is, power coil 30 is energized with a pulsative D.C. current during the power cycle when the circuit does not include generator coil 36, and, power coil 30 is energized with a steady D.C. current during the power cycle when the circuit includes generator coil 36. It would be desirable to add generator coil 36 for some applications of the motor and the coil could be connected in series with the control circuit by conductors 37 and 38 and the control circuit would then be disconnected at point 39, all as shown by FIGURE 1 and FIGURE 3 of the drawings.

As described for the motor illustrated in FIGURE 1, a torque is imparted to the motor rotor for 180° of the rotor rotation and no torque is imparted to the rotor for the other 180° of rotation. Therefore, the motor would not self start should it stop in some position of the 180° where no torque would be applied. Such no torque position is referred to as a "dead spot." Although the motor of FIGURE 1 is not always self starting since it has a 180° dead spot, it can be appreciated that additional driving circuits can be added to the system in a number of arrangements so that there is no dead spots and the motor is assured of being self starting. Inventors have found that a simple way of assuring self starting is to have three driving transistors and associated circuits equally spaced around the rotors so that at least one of the circuits is always magnetically coupled with section 13 and imparting a torque to the motor rotor.

Obviously, many modifications, variations and alternate methods of construction are possible in the light of the above teachings. For instance, oscillator coil 34 may be connected in series with drive coil 30; the control circuit coils 33, 34, and 35 may be arranged in many different ways on pickup arms 21, 22, and 23 such as arranging the oscillator coil 34 on the outside arms 21 and 23 and arranging the pickup coils 33 and 35 together on inside arm 22; control rotor 12 can be made in many forms and the ferromagnetic sections of rotor 12 can be arranged for any desired coverage of rotor 12 periphery; the motor rotor 10 can be provided with any desired number of magnetic poles by matching the ferromagnetic sections of rotor 12 accordingly; there are many known variations and forms for the driving coil 30 and structure 50; transistor 32 can be used to control other transistors, semi-conductors or switches and, in fact, transistor 32 may be replaced by tubes or any of a number of known controllable switching devices; and, of course, the motor of FIGURE 1 is shown for illustrative purposes with only one transistor and driving circuit whereas any desired number of driving circuits can be provided for any desired coverage of the motor rotor.

What is claimed is:
1. An electric motor comprising:
(a) field coils suitably mounted for generating magnetic fields in selected areas;
(b) a permanently magnetized rotor suitably mounted for rotation within said areas;
(c) a source of electric power, including switching means, coupled with said field coils to selectively energize said field coils when said switching means is conductive;
(d) a structure made of ferromagnetic material defining a plurality of open flux path circuits having a first winding coupled with said switching means and magnetically coupled with a selected portion of said structure for controlling the conductivity of said switching means in a relationship to the polarity of a current induced in said winding;
(e) a second winding, coupled with said switching means and powered by said source of electric power so that said second winding is energized when said switching means is conductive, magnetically coupled with a selected portion of said structure to induce said current in said first winding;
(f) and a second structure, suitably mounted for rotation with said rotor, having sections of ferromagnetic material positioned on selected areas of said second structure to selectively close said flux path circuits in a relationship to the position of said rotor for controlling the polarity of said current induced in said first winding by controlling the path of said magnetic flux;
(g) said second structure having selected positions that direct said magnetic field to induce said current in said first winding to be of a selected polarity that complements the conductivity of said switching means and causes said switching means to sustain a state of oscillations in said second winding and having other positions that reverse said selected polarity and prevent said switching means from being conductive.

2. An electric motor comprising:
(a) field coils suitably mounted for generating magnetic fields in selected areas;
(b) a permanently magnetized rotor suitably mounted for rotation within said areas;
(c) a source of direct current;
(d) a transistor having a main current carrying path with an input electrode, an output electrode, and a control electrode;
(e) a circuit, serially coupling said field coils and said direct current with said input and output electrodes, to energize said field coils when said current carrying path is conductive;
(f) a first winding, coupled between said control electrode and said input electrode, to control the conductivity of said current carrying path in a relationship to the polarity of a control current applied to said control electrode;
(g) a second winding, coupled between said output electrode and said direct current source and energized when said current carrying path is conductive, to electromagnetically induce said control current in said first winding;
(h) a first structure, made of ferromagnetic material defining a plurality of open flux path circuits that magnetically couple said first winding with said second winding, to control the conductivity of said current carrying path in phase with the polarity of regenerative oscillations of said first winding by allowing said second winding to induce a current of a first polarity in said first winding when a selected flux path circuit is closed, and to prevent said current carrying path from being conductive when another flux path circuit is closed by allowing said second winding to induce a current of a second polarity in said first winding;
(i) and a second structure, suitably mounted for rotation with said rotor and magnetically coupled with said first structure, having sections of ferromagnetic material positioned on selected areas of said second structure, to selectively close said flux path circuits in a relationship to the position of said rotor.

3. The combination recited in claim 2, including a third winding magnetically coupled with said rotor and serially coupled with said first winding to selectively cancel the control of said first winding and control the conductivity of said current carrying path.

4. An electric motor comprising:
(a) a permanently magnetized rotatable rotor;
(b) a field coil suitably mounted in flux inducing relationship to said rotor;
(c) an oscillator circuit serially coupled between the inlet and outlet terminals of said field coil comprising
 (1) a source of direct current having a negative and positive terminal with said negative terminal coupled to said field coil outlet terminal,
 (2) a semi-conductor having an inlet, an outlet, and a control terminal with said inlet terminal coupled to the positive terminal of said current source, and with said outlet terminal coupled to said field coil inlet terminal,
 (3) a control coil, for controlling the conductivity of said semi-conductor in a relationship to the polarity of said control coil, consisting of a continuous winding having a first and second coil portion and an inlet and outlet terminal with said control coil inlet and outlet terminals serially coupled between said semi-conductor inlet and control terminals,
 (4) an exciter coil having an inlet and outlet terminal with the inlet terminal coupled to said semi-conductor outlet terminal and the outlet terminal coupled to said power source negative terminal,
 (5) and a magnetic structure magnetically coupling said exciter coil to said first coil portion with a first open magnetic circuit and magnetically coupling said exciter coil to said second coil portion with a second open magnetic circuit so that
  when said first open magnetic circuit is closed, the current induced in said first coil portion by said exciter coil is of a first polarity that causes said semi-conductor to be conductive and allows said oscillator circuit to assume a state of self-regenerative oscillations
  and when said second open magnetic circuit is closed, the current induced in said second coil portion by said exciter coil is of a second polarity that causes said semi-conductor to be non-conductive and stops the oscillations of said oscillator circuit;
(d) and a rotatable structure, suitably mounted for rotation with said rotor, having a first and second section of ferromagnetic material suitably positioned on said rotatable structure so that
 said first section of ferromagnetic material closes said first magnetic circuit for selected positions of said rotatable structure and allows said oscillator circuit to oscillate and energize said field coil to impart a torque to said rotatable rotor for such selected positions
 and said second section of ferromagnetic material closes said second magnetic circuit for other selected positions of said rotatable structure and stops said oscillations and said torque for such other selected positions.

5. An electric motor comprising:
(a) field coils suitably mounted for generating magnetic fields in selected areas;
(b) a permanently magnetized rotor suitably mounted for rotation within said areas;
(c) a source of direct current, coupled with said field coils, including switching means for selectively energizing said field coils to rotate said rotor;
(d) pickup means, coupled with said switching means, for receiving an induced electric current to control the conductivity of said switching means in a relationship to the polarity of said induced current;
(e) an exciter coil, energized in a relationship to the conductivity of said switching means, to induce said current in said pickup means;
(f) magnetic conveying means suitably mounted for rotation with said rotor to selectively control the energization of said exciter coil by controlling the polarity of said current induced in said pickup means by said exciter coil in a relationship to the position of said rotor;
(g) and additional means magnetically coupled with said rotor to control said switching means and selectively cancel the control of said pickup means.

6. An electric motor comprising:
(a) field coils suitably mounted for generating magnetic fields in selected areas;
(b) a permanently magnetized rotor suitably mounted for rotation within said areas;
(c) a source of direct current, coupled with said field coils, including switching means for selectively energizing said field coils to rotate said rotor;
(d) pickup means, coupled with said switching means, for receiving an induced electric current to control the conductivity of said switching means in a relationship to the polarity of said induced current;

(e) oscillator means to induce said current in said pickup means;

(f) magnetic conveying means suitably mounted for rotation with said rotor to selectively control said switching means by controlling the polarity of said current induced in said pickup means;

(g) and additional means magnetically coupled with said rotor to control said switching means and selectively cancel the control of said pickup means.

References Cited by the Examiner

UNITED STATES PATENTS

| | | | |
|---|---|---|---|
| 2,986,684 | 5/61 | Cluwen | 318—254 |
| 3,050,671 | 8/62 | Moller | 318—254 |
| 3,091,728 | 5/63 | Hogan et al. | 318—138 |

ORIS L. RADER, *Primary Examiner.*

JOHN F. COUCH, *Examiner.*